Sept. 24, 1968      D. W. PUFFER ET AL      3,403,054
FUEL CELL WITH ION-PERMEABLE MEMBRANE
Filed Aug. 18, 1961
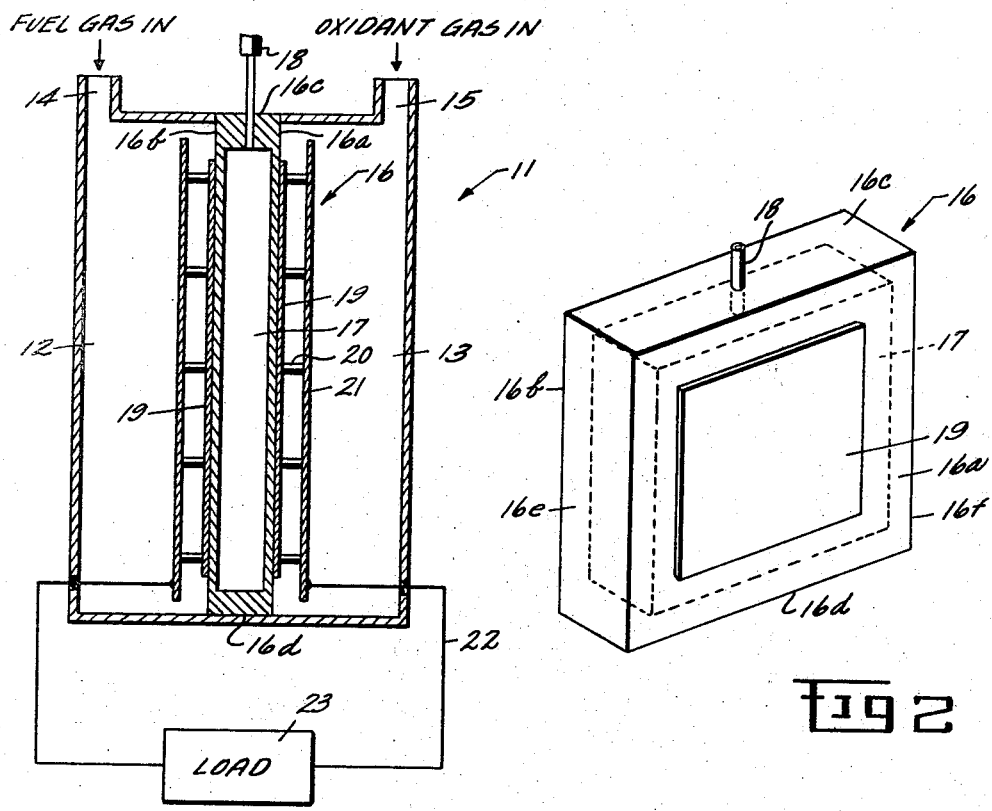
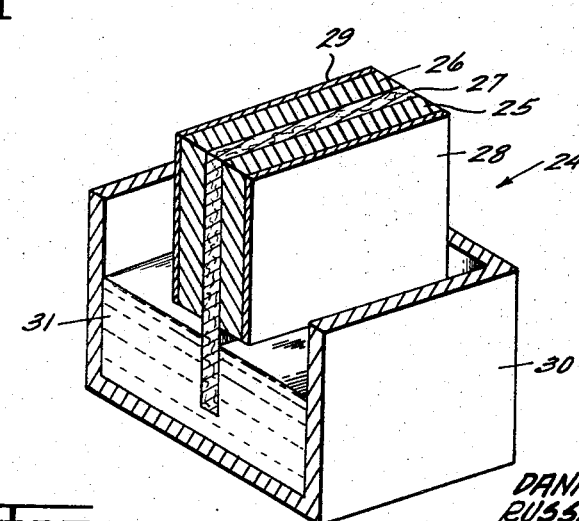
INVENTORS.
DANIEL W. PUFFER
RUSSELL M. DEMPSEY
ARNOLD P. FICKETT
BY *Harold A. Levey, Jr.*
ATTORNEY 3,403,054
FUEL CELL WITH ION-PERMEABLE MEMBRANE
Daniel Wood Puffer, Melrose, Russell Mason Dempsey, South Hamilton, and Arnold Perry Fickett, Lynn, Mass., assignors to General Electric Company, a corporation of New York
Filed Aug. 18, 1961, Ser. No. 132,462
23 Claims. (Cl. 136—86)

This invention relates to fuel cells and, more particularly to ion exchange membrane fuel cells.

United States Patent 2,913,511—Grubb, assigned to the assignee of this invention discloses and claims a novel gaseous fuel cell having an ion exchange membrane as an electrolyte and as a physical barrier separating two reactant gases such as a fuel gas from an oxidant gas.

Ion exchange resins, like those suitable for use in the fuel cell of Grubb, are widely described in the literature, for example in "Ion Exchange," Nachod Academic Press, Inc., New York (1950); "Ion Exchange Resins," (second edition) Robert Kunin, John Wiley and Sons, Inc., New York (1958) and in such U.S. patents as 2,366,007—D'Alelio; 2,366,008—D'Alelio, and the like.

The formation of these ion exchange resins into membranes is also well known in the art having been reported in such patents as U.S. Re. 24,865—Juda et al., 2,702,272—Kasper, as well as described and claimed in copending application Ser. No. 91,141—Oster et al., filed Feb. 25, 1961, now Patent No. 3,207,708, assigned to the assignee of this invention.

The solvents used in making the membranes can be water as in the case of the above-mentioned Juda et al. patent or an organic solvent as described in the patent 2,730,768—Clarke. As used herein, however, the terms "moisture," "hydrated," "humidifying electrolyte," and "water" are meant to include organic solvent solutions as well as water and water solutions.

Ion exchange membranes are of the cation permeable or anion permeable type, the reactions in either case being different from the other. When a membrane is of the cation permeable type having H+ as the mobile ion and the fuel and oxidant gases are hydrogen and air respectively, the overall cell reaction is oxidation of hydrogen to water as follows:

Anode: $H_2 = 2H^+ + 2e$
Cathode: $\frac{1}{2}O_2 + 2H^+ + 2e = H_2O$

It is noted that in the above reaction, a product is water. Because the membrane itself is substantially saturated with water prior to the operation of this cell, the water collects at the oxidant side from which it flows, or it may be easily evaporated.

When the ion exchange membrane is of the anion type with hydrogen and air as the fuel and oxidant gases respectively, the following cell reaction occurs:

Anode: $H_2 + 2OH^- = 2H_2O + 2e$
Cathode: $\frac{1}{2}O_2 + H_2O + 2e = 2OH^-$

As with the cation type membrane, water is a product of reaction, in this case collecting at the fuel gas side from which it flows or is evaporated.

Similar reactions with fuel gases other than hydrogen result in the same accumulation of water at one side or the other of the ion exchange membrane.

Even though water is a product of the cell reaction there are conditions present which tend to dehydrate certain types of membranes as, e.g., the phenol sulfonic acid-formaldehyde resin membranes. First of all, there is a considerable amount of heat generated within the cell as the load is increased. Then too, when air is used as the oxidant much less water is produced for a given weight of air fed to the cell than is produced when pure oxygen is used.

Although such ion exchange membranes can be fully hydrated prior to operation in the fuel cell, as the reaction progresses the membrane is slowly depleted of water to the point at which it can no longer operate efficiently. For example, the loss of water can cause openings, such as cracks or pores, to form in the membrane due to excess stress from contraction of the resin thus allowing the fuel and oxidant gases to mix directly. Furthermore, loss of water can significantly change the ion conducting ability of the membrane.

It has been proposed that the moisture or solvent content of the ion exchange membrane be replenished by humidifying one or both of the reactant fuels. Another approach is to supply moisture, such as by flowing water over the membrane or by carrying water to the membrane surface in the gas chamber by wicking means. These methods of moisture replenishment to the external surfaces of the membrane, however, either drown out, cover or mask a significant part of the active sites on the surface of the membrane. Such sites act to catalyze reaction occurring at the membrane surface. For this reason inactivation of such sites can reduce significantly the fuel cell performance.

It is, therefore, an object of this invention to provide an improved ion exchange membrane fuel cell exhibiting longer membrane life.

Another object is to provide an improved ion exchange membrane fuel cell not subject to the deleterious performance effects resulting from membrane dehumidification.

These and other objects and advantages will be better understood from the following detailed description and examples taken with the accompanying drawing in which:

FIG. 1 is a partially diagrammatical sectional view of a fuel cell including an ion exchange membrane having a single internal cavity;

FIG. 2 is an isometric view of the membrane system of FIG. 1; and

FIG. 3 is a partially diagrammatical, sectional view of another embodiment of a fuel cell ion exchange membrane system with internal wicking means.

Briefly stated, the present invention, in one form, comprises, a fuel cell having an ion exchange membrane system disposed between and in contact with a pair of electrodes. A humidifying electrolyte is provided within the ion exchange membrane system. Also provided are means for supplying a fuel to one of the electrodes and an oxidant to the other of the electrodes.

In one form, the present invention comprises, in a gaseous fuel cell, an ion exchange membrane system having a plurality of interconnected ion exchange resin portions. Each ion exchange resin portion has an electrode contacting surface and a cavity defining surface. The membrane system acts as a physical barrier to prevent the intermixing of reactant gases. A non-reactant humidifying electrolyte is disposed in the cavity or compartment defined by the resin portions which are in contact with electrodes thereby providing an ionically conductive path for the passage of ions between the electrodes. Means are also provided to supply electrolyte to the cavity.

Although the present invention will be described in connection with specific examples, these are meant to be illustrations of rather than limitations on the scope of this invention.

In the partially diagrammatical sectional view of FIG. 1, a gaseous fuel cell shown generally at 11 includes two reactant gas chambers 12 and 13. The chamber 12 is, for example, a fuel gas chamber such as for hydrogen fed by a gas inlet means like tube 14. Chamber 13 is, for example, an oxidant gas chamber such as for air fed by gas inlet means like tube 15. Reactant gas chambers 12 and 13 are physically separated by an ion exchange membrane ssytem shown generally at 16 in FIGS. 1 and 2.

The ion exchange membrane system 16 may include a plurality of interconnected outer ion exchange membrane system portions 16a, 16b, 16c, 16d, 16e, and 16f, each having outer surfaces which define the outer shape of the membrane system and inner surfaces which define a cavity or compartment 17. Alternatively, it may be formed as a unitary structure. As shown in FIGURE 1, system portions 16a and 16b are thin sheets forming spaced ion exchange membranes, and system portions 16c, 16d, 16e, and 16f are somewhat thicker in cross section forming relatively thicker sheets or bars. While the system portions include an ion exchange resin as an essential component, the ion exchange resin need not be the only component present. The ion exchange resin may be held in the form of granules or beads by an inert matrix as is shown to be conventional by the previously noted patent to Juda et al. Communicating with the cavity or compartment 17 is a liquid feed means such as tube 18 adapted to supply, from some suitable source (not shown), a fluid to the cavity or compartment 17 which will provide, during operation of the cell, an ionically conductive path between the electrodes 19. The fluid supplied is not reactive with the ion exchange membrane portions except to the extent that it supplies a suitable humidifying electrolyte. Examples of such a humidifying electrolyte would be an acidic or basic solution or gel, the former being suitable for use with cationic membranes and the latter with anionic membranes; solutions of organic solvent electrolytes such as formamide; and water, which becomes an electrolyte in this environment by leaching dissociable ionic groups from the membrane.

Porous electrodes 19, which can also act to catalyze the reaction occurring on the surface of the ion exchange membrane, are carried by the membrane system and are in intimate contact with both the ion exchange membrane and the reactant gases in their respective gas chambers.

Contacting the electrodes 19 are projections 20 on current collecting means or grids 21. The current collecting means 21 can be electrically connected through a means such as conductor 22 to a load 23, for example an electric motor.

Referring now to FIG. 3, there is here shown another embodiment of a fuel cell ion exchange membrane system designated generally as 24. This system comprises a pair of ion exchange membranes 25 and 26 having an absorbent material 27, such as a wick or mat, disposed therebetween. The ion exchange membranes 25 and 26 are in turn disposed between and in contact with a pair of porous electrodes 28 and 29. Also provided is a means, such as a reservoir 30, for wetting the absorbent material 27 with a humidifying electrolyte 31.

As mentioned heretofore certin ion exchange membranes, which are initially hydrated, tend to lose water as the cell reaction progresses. The present invention counteracts these water losses, for example, by supplying additional humidifying electrolyte to the cavity or compartment 17 in the embodiment of FIG. 1 or to the absorbent material 27 in the embodiment of FIG. 3.

Although the manufacture of ion exchange membrane fuel cells is now well known, as indicated above, there follows a brief discussion of some criteria useful in manufacturing the fuel cells of the present invention. In accordance with the customary practice an ion exchange resin is selected and prepared by polymerizing a mixture of ingredients, one of which contains an ionic substituent. In the case of cation exchange resins, these substitutents or ionic groups are acidic groups such as the sulfonic acid group, the carboxyl group, and the like. The anion exchange resin contains an ionic group basic in nature, such as the amine group, quaternary ammonium hydroxides, the guanidino group, the cyanoguanidino group, and similar nitrogen-containing basic groups. Ion exchange resins of this sort have the ionizable group attached to a polymeric compound, such as those described in the above references. These resins are formed into membranes or sheets that are either homogeneous or heterogeneous in character. In the heterogeneous or mosaic type, the granules of ion exchange resin are incorporated into a sheet-like matrix of a suitable binder, as for example, polyethylene or polyvinyl chloride. The homogeneous or continuous ion exchange resin membrane has uniform ion exchange characteristics and is molded or cast into sheet form while still in the partially polymerized state.

Ion exchange resins are generally prepared as aqueous solutions or emulsions of selected organic compounds so that when the membrane is formed it is substantially saturated with water. A phenol sulfonic acid-formaldehyde resin, for example, is found to contain a plurality of reactive sites consisting of $-SO_3H$ radicals attached to the resin matrix with sufficient water being held in the resin matrix by Van der Waals force so that the $H^+$ ion is extremely mobile in the resin matrix. In this form the resin is described as being hydrated. The amount of water, or organic solvent, in a hydrated ion exchange resin membrane varies widely depending upon the particular composition of the resin and its physical structure. In the phenol sulfonic acid-formaldehyde resin example from perhaps 15% to 50%, by weight, of water is held in the resin by secondary Van der Waals forces.

The thickness of the membranes employed in the practice of the present invention is not critical, however 25 mils is typical. For economic reasons, however, the membranes are preferably as thin as possible. Since the membrane acts as a physical barrier separating the fuel from the oxidant, it is necessary that it possess sufficient structural integrity to inhibit intermixing of the reactants.

Although various types of electrodes are suitable for use in the cells of the present invention, each electrode preferably should be a good electronic conductor, should absorb the fuel employed, and should act as a catalyst for the electrode reaction. Suitable catalyst materials are well known and are described, for example, in "Catalysis, Inorganic and Organic," Berkman, Morrel and Egloff, Reinhold Publishing Co., New York (1940), and "Catalytic Chemistry," H. W. Lohse, Chemical Publishing Co., Inc., New York (1945). Further examples of such materials as well as methods of applying them to ion exchange resin membranes are more fully described in the copending application of Leonard W. Niedrech, Ser. No. 850,589, filed Nov. 3, 1959, now Patent No. 3,134,697 and assigned to the assignee of the present invention.

Following the application of the electrode materials and further polymerization of the resin membrane, current collecting means, such as metal screens, metal wires, metal bars, punched or expanded metal plates, etc., are placed in contact with the electrode. The current collecting means must permit the reactants to contact the electrode surface on the ion exchange membranes. Such current collectors may envelop the membrane structure to provide a conduit for the reactants, or the current collectors and membrane structure may be externally packaged as illustrated, for example, in FIG. 1.

The shape of the fuel cell may be varied and may conveniently be chosen to fit into almost any preselected existing space. When hydrogen and oxygen, for example, are used as the fuel and oxidant gases, respectively, means for supplying such gases may range from the utilization of hydrogen-producing materials as water solutions of metal hydrides or borohydrides and such oxygen-producing materials as calcium superoxide. Various generators could also be used, as for example, a Kipp generator so that at a given predetermined pressure the water or acid would be removed from contact with the gas generating chemicals. In the alternative, pressure actuated or flow valves could be used to regulate flow of the generating fluid.

The fuel cells of this invention may be utilized in any application requiring a reliable source of direct current. As an example, utilizing porous electrodes of the type disclosed in the above noted Niedrach application, quaternary ammonium hydroxide substituent containing anion exchange membranes of the type disclosed in the above noted Juda et al. patent, hydrogen as a fuel, air as an oxidant, and water as an ion transport media, the fuel cell 11 shown in FIGURE 1 operates as follows:

The mobile hydroxyl ions diffuse into the water to form an aqueous alkaline electrolyte solution. The hydroxyl ions are selectively transported through the ion exchange membrane 16b to form water upon contact with the hydrogen fuel at the electrode 19 serving as the anode. Electrons are given up in the formation of water, and the electrons are transported to the electrode 19 serving as the cathode through the external circuit 22 and the load 23. The reaction of the oxygen in the air present at the cathode with the water present in the ion exchange membrane 16a forms additional hydroxyl groups and takes up electrons from the external circuit 22. The hydroxyl ions so formed being mobile are free to re-enter the electrolyte solution and to again migrate to the anode.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What we claim as new and desire to secure by Letters Patent is:

1. A fuel cell comprising: a pair of spaced electrodes, a hollow imperforate ion exchange membrane system disposed between and in contact with said electrodes, said ion exchange membrane system defining and enclosing a compartment serving as a container for supernatant humidifying electrolyte, means for introducing said humidifying electrolyte within said compartment, and means for supplying a fuel to one of said electrodes and an oxidant to the other of said electrodes.

2. A fuel cell comprising: a pair of spaced electrodes, a pair of ion exchange membranes disposed between and in contact with said electrodes, imperforate ion exchange means joining said ion exchange membranes and cooperating therewith to form a compartment serving as a container for a humidifying electrolyte, said ion exchange means including means for introducing said humidifying electrolyte within said compartment, and means for supplying a fuel to one of said electrodes and an oxidant to the other of said electrodes.

3. A fuel cell comprising: a pair of spaced electrodes, a pair of membranes formed of ion exchange resin disposed between and in contact with said electrodes, an absorbent wick material, wettable with a humidifying electrolyte, disposed between and in contact with said ion exchange membranes, and means for supplying a fuel to one of said electrodes and an oxidant to the other of said electrodes.

4. A fuel cell comprising: a pair of spaced electrodes, an ion exchange membrane disposed between and in contact with said electrodes; an absorbent wick material, wettable with a humidifying electrolyte, disposed between and in contact with said ion exchange membranes; means for wetting said material with a humidifying electrolyte; and means for supplying a fuel to one of said electrodes and an oxidant to the other of said electrodes.

5. A fuel cell comprising: a pair of spaced electrodes, an ion exchange membrane system disposed between and in contact with said electrodes; said membrane system defining a humidifying electrolyte containing a pocket interiorly thereof, said membrane system including an aperture for receiving said humidifying electrolyte into said pocket; and means for supplying a fuel to one of said electrodes and an oxidant to the other of said electrodes.

6. A fuel cell comprising: a spaced pair of gas adsorbing electrocatalytic electrodes; an ion exchange membrane system disposed between and integrally bonded to said electrodes; the peripheral portion of said ion exchange membrane system comprising imperforate ion exchange means extending between said electrodes and forming a pocket within said membrane system serving as a container for supernatant humidifying electrolyte; said membrane system including means adapted to allow introduction of humidifying electrolyte within said pocket; and means for supplying a gaseous fuel to one of said electrodes and a gaseous oxidant to the other of said electrodes.

7. A fuel cell comprising: a spaced pair of gas adsorbing electrodes; a spaced pair of imperforate ion exchange resin membranes lying between and in contact with said electrodes; imperforate ion exchange means extending between said electrodes peripherally of said ion exchange membranes and cooperating with said membranes to form a compartment capable of containing a liquid electrolyte, said ion exchange means including means adapted to allow introduction of said liquid electrolyte into said compartment; current collecting means in contact with said electrodes; and means for supplying a gaseous fuel to one of said electrodes and a gaseous oxidant to the other of said electrodes.

8. A fuel cell of the character described comprising a pair of spaced porous electrodes; a first ion-permeable membrane in contact with one of said electrodes; a second ion-permeable membrane in contact with the second of said electrodes, said ion-permeable membranes further characterized in that they substantially preclude passage of gas; water between and in intimate contact with each of said ion-permeable membranes; and ion-exchange means traversing said solution and being in intimate contact with said ion-permeable membranes on either side of said water.

9. A fuel cell as defined in claim 8 including source means for providing oxidant gas to one of said electrodes and source means for providing a combustible fuel gas to the other of said electrodes.

10. A fuel cell as defined in claim 9 including spacer means in contact with at least one of said electrodes and the gaseous source means associated therewith, said spacer means being permeable to and permitting passage of gas from said source means to said electrode.

11. A fuel cell as defined in claim 9 wherein said oxidant source means contains an oxidant gas selected from the group consisting of oxygen and oxygen-containing gases and said fuel source contains a fuel selected from the group consisting of hydrogen and hydrogen-containing combustible gases wherein the by-product of the cell reaction is water.

12. A fuel cell as defined in claim 8 wherein at least one of said ion-permeable membranes comprises an ion-exchange membrane.

13. A fuel cell as defined in claim 12 wherein both of said ion-permeable membranes and said ion-exchange means are anion-exchange materials.

14. A fuel cell as defined in claim 8 wherein said ion-exchange means comprise a plurality of sheets of ion-exchange material.

15. A fuel cell as defined in claim 8 wherein said ion-exchange means comprise a plurality of bars of ion-exchange material.

16. A fuel cell as defined in claim 8 wherein said ion-exchange means comprise a plurality of beads of ion-exchange material.

17. A fuel cell comprising a porous cathode; means for introducing an oxidizing gas into said cathode; a first anion-exchange membrane in intimate contact with at least the inner side of said cathode; a porous spaced anode;

means for introducing into said anode a fuel gas selected from the group consisting of hydrogen and hydrogen-containing combustible gases; a second anion-exchange membrane in intimate contact with at least the inner side of said anode; water between and separating said anion-exchange membranes; and ion-exchange means traversing said water and contacting each of said anion-exchange membranes.

18. A process for producing electrical energy from a hydrogen ion producing gas and an oxidizing gas which comprises continuously selectively passing hydroxyl ions from an anion exchange material through a first ion-permeable means to a first electrode said exchange material traversing a water medium; reacting hydrogen with the hydroxyl ions at said electrode to form water and free electrons; conducting said electrons through a load to a second electrode; reacting oxygen with water from said water medium in the presence of said electrons at said second electrode to form hydroxyl ions; and continuously selectively passing the hydroxyl ions formed at said second electrode to said water medium.

19. A fuel cell of the character described comprising a pair of spaced porous electrodes; a first ion-permeable membrane on one side of one of said electrodes; a spaced second ion-permeable membrane on one side of the second of said electrodes, said ion-permeable membranes further characterized in that they substantially preclude passage of gas; and a solution of electrolyte between and in intimate contact with each of said ion-permeable membranes.

20. A fuel cell as defined in claim 19 including source means for providing oxidant associated with one of said electrodes and source means for providing a combustible fuel associated with the other of said electrodes.

21. A fuel cell as defined in claim 19 wherein at least one of said ion-permeable membranes comprises an ion-exchange membrane.

22. A fuel cell as defined in claim 20 including spacer means in contact with at least one of said electrodes and the source means associated therewith, said spacer means being permeable to and permitting passage of gas from said source means to said electrode.

23. A fuel cell as defined in claim 20 wherein said oxidant source means contains an oxidant selected from the group consisting of oxygen and oxygen-containing gases and said fuel source contains a fuel selected from the group consisting of hydrogen and hydrogen-containing gases.

References Cited

UNITED STATES PATENTS

| | | | |
|---|---|---|---|
| 2,851,510 | 9/1958 | Pauli | 136—86 |
| 2,913,511 | 11/1959 | Grubb | 136—86 |
| 2,942,053 | 6/1960 | Baldwin et al. | 136—143 |
| 2,988,584 | 6/1961 | Peters | 136—144 |
| 3,097,116 | 7/1963 | Moos | 136—120 |
| 3,116,170 | 12/1963 | Williams et al. | 136—86 |
| 3,117,034 | 1/1964 | Tirrell | 136—86 |
| 3,152,014 | 10/1964 | Berger et al. | 136—86 |
| 3,152,015 | 10/1964 | Tirrell | 136—86 |

OTHER REFERENCES

Status Report on Fuel Cells, June 1959, p. 20.

ALLEN B. CURTIS, *Primary Examiner*.